United States Patent [19]

Weir, Jr.

[11] 4,285,405
[45] Aug. 25, 1981

[54] OSCILLATOR FOR RECIPROCATING TOOL OR OTHER DEVICE

[76] Inventor: Casper J. Weir, Jr., Rte. 3, Box 215-B, San Luis Obispo, Calif. 93401

[21] Appl. No.: 106,915

[22] Filed: Dec. 26, 1979

[51] Int. Cl.³ .............................................. E21B 3/00
[52] U.S. Cl. ................................ 173/162 R; 173/49; 74/87; 74/61; 30/169
[58] Field of Search ................. 173/162, 49; 15/93 R; 74/87, 61; 30/42, 44, 169–171; 299/37

[56] References Cited

U.S. PATENT DOCUMENTS

| | | | |
|---|---|---|---|
| 3,212,345 | 10/1963 | Rechenberg et al. | 74/87 |
| 3,233,474 | 2/1966 | Ross et al. | 74/87 |
| 3,280,924 | 10/1966 | Pavlovich | 173/49 X |
| 3,498,601 | 3/1970 | Koval | 74/61 X |
| 3,604,520 | 9/1971 | Shatto | 30/169 X |
| 3,832,080 | 8/1974 | Stoecker | 74/61 X |
| 4,009,908 | 3/1977 | Alinder et al. | 30/169 X |

Primary Examiner—Ronald Feldbaum
Attorney, Agent, or Firm—Harlan P. Huebner

[57] ABSTRACT

An oscillator for reciprocating tools or other devices. Driving sprockets are mounted for rotation on a frame or in a housing and a pair of driven sprockets are mounted on the frame, each to be driven by a respective driving sprocket. The driven sprockets are outwardly of the driving sprockets, all sprockets having their axes in the same plane. Eccentrically mounted masses are on the shafts of the driven sprockets which when rotated generate forces on the axes of the driven sprockets. These forces are transmitted to the frame through shafts of the driven sprockets. A couple is generated about the axis of the driving sprocket causing the frame to oscillate. A tool attached to the lower end of the frame is thereby reciprocated.

12 Claims, 3 Drawing Figures

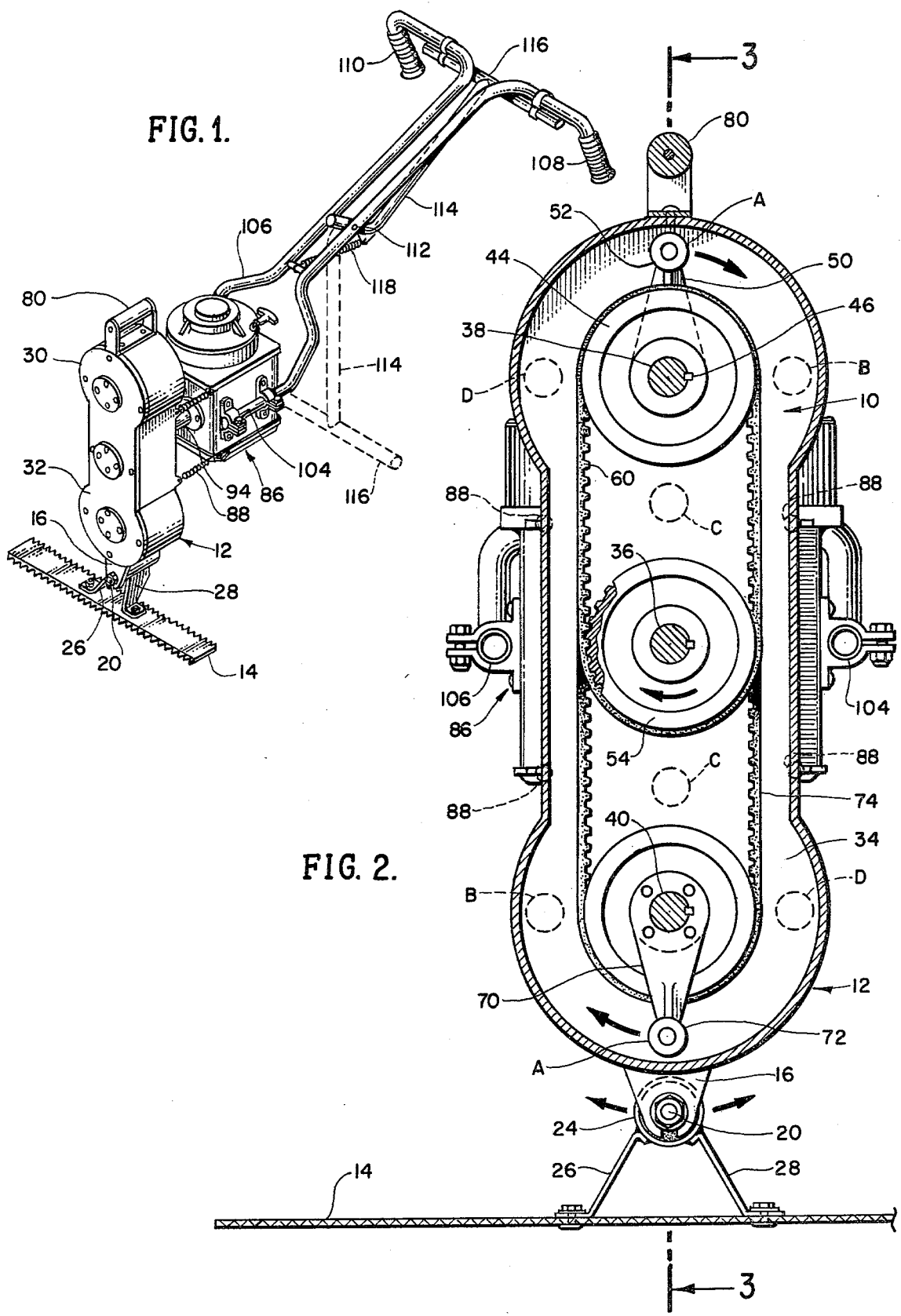

OSCILLATOR FOR RECIPROCATING TOOL OR OTHER DEVICE

BACKGROUND OF THE INVENTION

In the prior art rotating masses have been used to impart reciprocating motion to various devices, such as paint shakers, electric sanding pads, dynamic balancers for automotive engines, and electric massagers. In all these structures there has been a resulting unbalance of forces that has been used to create a force or motion to a supporting mechanism.

SUMMARY OF THE INVENTION

In the present invention rotating masses are mounted eccentrically on arms on driven sprockets, for example, the sprockets being driven to rotate on shafts bearing-mounted in a frame or housing. The sprockets are spaced, and rotated in synchronism so that the radial forces created by the eccentric masses are balanced about an axis of a driving sprocket spaced centrally between the driven sprockets. The driving sprocket is also mounted in the same frame and the axes of the three sprockets are typically in the same plane.

The resultant of the torque from the driving pull on the driven sprockets acting through the arms to the rotating masses generates forces on the axes of the two driven sprockets. These forces are tangential with respect to the axis of the driving sprocket. The tangential forces are transmitted to the frame or housing by each of the two driven sprockets through their shafts. A couple is thereby generated about the axis of the driving shaft. This would cause the frame to oscillate about an equilibrium position. Oscillation about the driving shaft is maintained by securing a device or tool to be reciprocated at a lower end, for example, with a resilient joint and by balancing the device with a mass fixed at the upper end. The balancing mass increases the amplitude of reciprocation and reduces vibration that could be transmitted to the driving means externally of the frame. Further, the product of inertia of attachments about the axis of the driving shaft is zero.

The result of the foregoing arrangement, according to the invention, is to maintain the driving means, externally of the frame and controlled and supported by an operator, free of any forces developed in the rotation of the eccentric masses. This is in contrast to the results achieved in the prior art mechanisms discussed above.

The forces developed within the frame will be reflected in the external driving mechanism when a reciprocated device mounted on the lower end of the frame is moved along a surface and encounters obstacles. That is, the engagement with the obstacles will act upon the driving means so that they will have to be controlled by the operator.

It is still another object of the invention to provide an oscillator in which the desired effect is to oscillate the above described frame or housing about the driving axis. However, the mass of a blade, for example, at the bottom of the frame and being reciprocated about the axis of the driving shaft is a single force acting in opposition to the couple generated by the rotation of the eccentrically mounted masses. The effect of the couple is to produce rotation and it is balanced in the present invention by another couple which is equal and opposite. Thus, by balancing the blade at the bottom of the frame with a mass at the top, the whole device rotates about the driving axis. When the blade is used as a hoe, for example, there is friction developed between it and the soil, and, in addition, the blade contacts objects in the soil which upset the intended operation. This can be compensated by increasing the mass at the top to be greater than would be required in an ideal situation where the operation upsetting objects were not encountered, and where the result is to maintain the axis of rotation or oscillation as near that of the driving shaft as possible.

Further objects and advantages of the invention may be brought out in the following part of the specification wherein small details have been described for the competence of disclosure, without intending to limit the scope of the invention which is set forth in the appended claims.

BRIEF DESCRIPTION OF THE DRAWINGS

Referring to the accompanying drawings, which are for illustrative purposes:

FIG. 1 is a perspective view of a mechanical hoe made according to the invention;

FIG. 2 is a cross-sectional elevational view of the invention, taken substantially along the lines 2—2 in FIG. 3.

DESCRIPTION OF THE PREFERRED EMBODIMENTS

Figure 3:
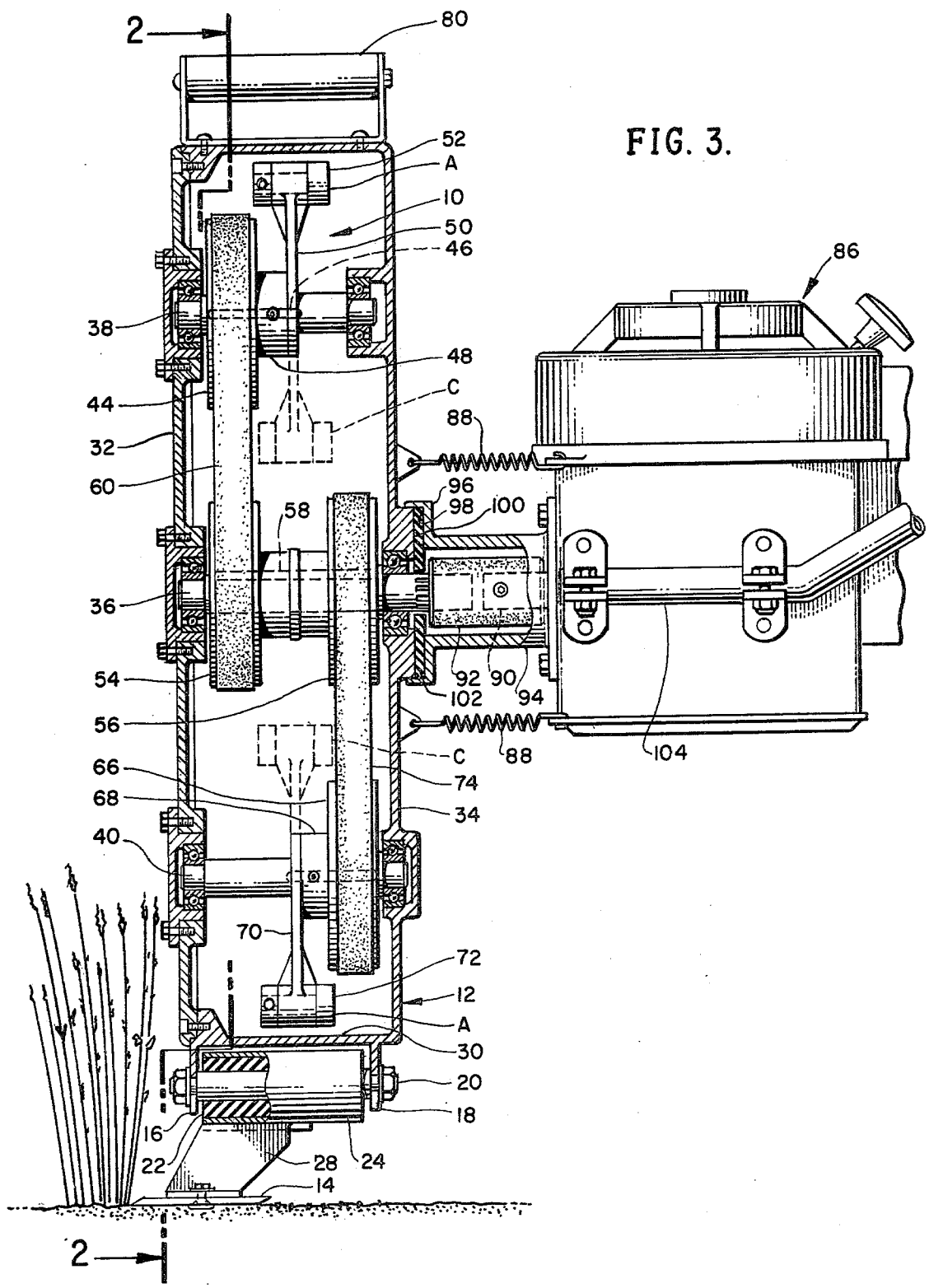
FIG. 3 is a cross-sectional elevational view, taken along the lines 3—3 in FIG. 2.

Referring again to the drawings, the invention is comprised of an oscillator, generally designated as 10, mounted in a frame or housing 12. Whether the frame would be a housing in the form of an enclosing case depends upon the use of the oscillator. In the embodiment shown, the entire device comprises a mechanical hoe having a double-edged scalloped blade 14; secured to the bottom of the frame 12. The blade is resiliently mounted between two vertically directed flanges 16 and 18 on a cylindrical shaft 20 bolted to the flanges. Surrounding the shaft and bonded thereto is an annular elastomeric sleeve 22. Surrounding the sleeve and bonded thereto is a cylinder 24. Secured to the lower end of the cylinder are two downwardly and outwardly extending support members 26 and 28 which connect the blade 14 to the cylinder.

When the oscillator 10 is used to reciprocate a hoe, for example, it must be enclosed in a housing, such as 12, comprised of enclosing members 30, 32, and 34 to keep the dirt out of the mechanism. Vertical frame members 32 and 34 support a centrally positioned driving shaft 36, an upper driven shaft 38, and a lower driven shaft 40, both driven shafts being equally spaced from the driving shaft and the axes of the three shafts being in the same plane. As shown in FIG. 3, the three shafts are bearing-mounted for rotation with respect to the frame 12.

On the upper driven shaft 38 is a sprocket 44 mounted for rotation by means of a spline 46. Extending inwardly from the sprocket is a smaller diameter cylinder 48, also splined to the shaft, and from which extends a radially directed arm 50. On the end of the arm 50, a weight or mass 52 is eccentrically mounted with respect to the shaft 38.

On the driving shaft 36, two driving sprockets 54 and 56 are mounted and are splined to the shaft at 58 for rotation therewith. The sprocket 54 drives the sprocket 44 by means of an endless timing belt 60. In alignment with the sprocket 56 is a sprocket 66 on the lower driven shaft 40, identical to the sprocket 44. Secured to a cylinder 68 on the sprocket is an arm 70 on which is eccentrically mounted a weight 72. The sprocket 56 drives the sprocket 66 by means of a timing belt 74. The weights 52 and 72 are shown to be cylindrical and of the same size and same weight. They may also be of other shapes, such as that of a circular segment. The sprockets and weights are shown by the arrows to be rotated in the clockwise direction. If gears are used instead of sprockets, the driving gear would be rotated in the counterclockwise direction.

The eccentrically mounted weights 52 and 72 are always synchronized, and are shown to be in correspondingly balanced positions, as A, B, C and D, so that the radial forces generated by their rotation are at all times balanced about the axis 36 of the driving sprocket.

To balance the mass of the blade and its resilient connection at the bottom of the frame, there is a balancing mass 80 connected to the top of the frame. It is diametrically opposite to the mass at the lower end. The product of its mass 80 and its effective distance from the axis of the driving shaft 36 must create the same moment as that created by the mass formed by the blade and its resilient connection. It is not necessary to have a single mass at the top; that is, a resultant vector of several masses can be used to meet the requirement. The arrangement must be such that if the driving shaft were clamped in a vise there would be no tendency for the assembly to rotate. To make this possible, the eccentric weights 52 and 72, as stated, are always in balance and in symmetry, the requirement being that the frame 12 be in balance about the axis of the shaft 36.

Outwardly of the driving shaft 36 is a power source 86 in the form of a gasoline powered engine or an electric motor, for example. The power source is connected to the frame by four tension springs 88 spaced rectangularly about the shaft 36. A power driven shaft 90 is connected to drive the driving shaft 36 by means of a flexible, splined coupling 92 within a housing 94. At the outer end of the housing 94 is a flange 96 having an annular bearing surface 98. Spaced from the surface 98 is a bearing surface 100 on the frame and extending between the surfaces 98 and 100 is a thrust washer 102. The washer 102 may be made of bronze, steel or babbitt metal, and the surfaces 98 and 100 are faced with teflon.

A simpler way to arrange the power source with the frame is to have the shaft 90 and the shaft 36 to be continuous and omit the flexible coupling 92. In this arrangement the thrust washer may be similarly spaced between two radial flanges, one extending outwardly of a frame extension and the other extending outwardly of a shaft housing in which the continuous driving shaft would be bearing-mounted. In both of the above arrangements, the springs hold the apparatus together and furnish restoring forces toward the equilibrium position during operation.

Connected to the power source are two spaced bars 104 and 106 which extend upwardly and terminate in handles 108 and 110, respectively, for gripping by the operator. Pivotally mounted between the bars at 112 is a T-leg 114 having a T-bar 116 clipped to the bars during operation, and being adapted to pivot downwardly by the force of the spring 118 so that the leg is in a vertical position and the bar 116 is in a horizontal position on a surface so as to support the handle and oscillator in an "at rest" position, the blade being on the same surface.

In operation, the oscillator 10 to reciprocate the mechanical hoe 14 is driven by a continuously rotating driving shaft 36. As the driven sprockets are rotated, the forces created by the rotation of the eccentric masses or flyweights 52 and 72 create radial forces that are at all times balanced about the axis of the driving sprocket 36. The resultant of the torque from the belt pulls, acting through the sprockets on the arms 50 and 70 to the rotating eccentric masses, generates forces on the axes of the driven sprockets. These forces are tangential with respect to the axis of the driving sprocket 36. The tangential components are greatest in mass positions A and C. The tangential forces are transmitted to the frame by each of the driven sprockets through their shafts. This results in a couple being generated about the axis of the driving shaft.

If free, the frame would oscillate about some equilibrium position, carrying the blade back and forth, if it were not for the fact that the power source is continuously applying power of which torque is a component. The input torque between the frame and the driver is compensated by a resisting torque applied by means of the springs 88 between the frame and the driver. The resilient joint 20, 22 and 24 depends upon the shear imposed upon the elastomeric material to allow movement and to restore the component parts to equilibrium.

The mass balance 80 at the upper end of the frame increases the amplitude of the blade and reduces vibration that could be transmitted to the power source 86.

The length of the arc of reciprocation of the blade is dependent upon the magnitude of the rotating masses 52 and 72, the length of their arms 50 and 70, the speed of rotation, the mass of the oscillating assembly, and the distance between the blade and the driving shaft axis. In regard to the connection of the power source to the frame, because work is being done, there is a tendency for the frame to rotate about the driving shaft 36. Contact with an obstacle, such as a weed, clod or rock, would tend to make the blade unmanageable. The springs 88 hold the frame and power source together and furnish restoring forces toward an equilibrium position.

With the operator holding the handles, the blade literally saws its way forwardly, requiring little effort other than guidance and some forward force. Pressing down on the handles causes the blade to move upwardly with respect to the soil and raising the handles causes the blade to move downwardly in the soil.

By way of example, the oscillating housing 12 is approximately one foot in the elongated direction and 4" in the direction of the blade. The thickness of the housing is about 2" along the plane through the axes of the shafts. The distance between the driving shaft axis and the blade is about 6". The blade is about 12" long and about 1" in width. The reciprocating travel of the blade is about $\frac{1}{2}$" to 1"; that is, the travel has an amplitude of $\frac{1}{4}$" to $\frac{1}{2}$". The vertical component of the arc of travel of the blade is negligible.

The invention and its attendant advantages will be understood from the foregoing description and it will be apparent that changes may be made in the form, construction and arrangements of the parts of the invention without departing from the spirit and scope thereof or sacrificing its material advantages, the arrangements hereinbefore described being merely by way of example. I do not wish to be restricted to the specific forms shown or uses mentioned except as defined in the accompanying claims.

I claim:

1. An oscillator comprising:
   a frame,
   a plurality of first means each connecting respective masses to said frame for rotation relative thereto, each mass having a respective axis of rotation in a respective first means,
   second means connecting rotatable driving means to said frame and to said first means to rotate said masses, said driving means having an axis of rotation in said second means and being spaced from the axes in the first means,
   each mass being spaced from its axis of rotation by a respective rotatable support, each mass and its axis being spaced with respect to the axis of the driving means so that rotation of said masses produces radial forces that are balanced with respect to said last axis,
   each mass being positioned on its support so that rotation of the masses by the driving means generates a force through the mass supports to the axes of the respective first means, said last force being tangential with respect to the axis in the second means,
   said first means being adapted to transmit said tangential forces to the frame to generate a couple about the axis of the second means to oscillate said frame about said last axis when said frame is supported for oscillation thereat,
   power means attached to said frame to rotate said driving means about its axis and to support said frame for oscillation at said last axis,
   a device to be reciprocated attached to said frame at one end thereof in the plane through said last axis, and
   handle means extending from said power means in a direction away from said frame;
   said device being attached at a lower end of said oscillator to support said oscillator on a surface; and
   said handle means being adapted for moving said device along said surface and for controlling the position of said oscillator.

2. The invention according to claim 1 in which:
   said device is connected with resilient means to said oscillator,
   said resilient means having shear imposed thereon by the oscillator when the device is operating against resistance, the resilient means being adapted to permit movement during said resistance and to restore the device, the resilient means, and the oscillator to equilibrium.

3. An oscillator comprising:
   a frame,
   a plurality of first means each connecting respective masses to said frame for rotation relative thereto, each mass having a respective axis of rotation in a respective first means,
   second means connecting rotatable driving means to said frame and to said first means to rotate said masses, said driving means having an axis of rotation in said second means and being spaced from the axes in the first means,
   each mass being spaced from its axis of rotation by a respective rotatable support, each mass and its axis being spaced with respect to the axis of the driving means so that rotation of said masses produces radial forces that are balanced with respect to said last axis,
   each mass being positioned on its support so that rotation of the masses by the driving means generates a force through the mass supports to the axes of the respective first means, said last force being tangential with respect to the axis in the second means,
   said first means being adapted to transmit said tangential forces to the frame to generate a couple about the axis of the second means to oscillate said frame about said last axis when said frame is supported for oscillation thereat,
   said first means each including a driven shaft supported for rotation in said frame;
   said mass supports being arms to support the masses eccentrically with respect to said driven shafts, the axis of rotation of each mass being in a driven shaft,
   said first means each including a driven wheel mounted on a respective shaft to rotate the same and a respective mass,
   said second means including a driving shaft supported for rotation in said frame, said axis of said driving means being in said driving shaft, and
   a pair of driving wheels mounted on said driving shaft for rotation therewith;
   each of said driving wheels being connected to drive a respective driven wheel.

4. The invention according to claim 3 in which:
   said driving and driven shafts are in the same plane, said driving shaft being centrally positioned between said driven shafts.

5. The invention according to claim 4 in which:
   a device to be reciprocated is attached to said frame at a lower end thereof, said plane extending through and being transverse to the path of reciprocation,
   and
   power means being attached to said frame to rotate said driving shaft.

6. The invention according to claim 5 in which:
   handle means extend from said power means in a direction away from said frame,
   said device being adapted to support said frame on a surface.

7. The invention according to claim 6 in which:
   resilient means attaching said device to said frame,
   said resilient means having a central shaft having its axis in said plane,
   a compressed annular elastomeric sleeve bonded to and surrounding a portion of said shaft,
   an outer cylinder surrounding said sleeve and being bonded thereto,
   said device being connected to said outer cylinder and depending therefrom.

8. The invention according to claim 7 in which:
   said device is a tool having a sharp leading edge extending in a direction generally opposite to said handle means,
   said edge being generally normal to said plane when not being reciprocated.

9. The invention according to claim 5 in which:
   said power means is attached to said frame by a plurality of springs.

10. The invention according to claim 3 in which:
    each of said wheels are sprockets,
    said driving wheels being connected to respective driven wheels by continuous belts.

11. A portable oscillator for tools and the like comprising
a housing containing
a shaft constituting a fulcrum on which said housing may oscillate,
paired eccentric masses rotatable on axes radially outwardly disposed with respect to said shaft; said masses being oppositely arranged with respect to each other on their respective axes whereby upon their synchronous rotation a couple is generated about the axis of said shaft, and
driving means connecting said shaft and said masses for rotation of the latter; said housing and its contents being rotationally balanced with respect to said fulcrum,
a prime mover connected to said shaft to rotate the same, and
handle means connected to said housing coaxially with said shaft whereby the same may be partially supported and may be steered while resting on a tool carried by said tool support.

12. A portable oscillator according to claim 11 having spring means connecting said housing and said handle means to restrain oscillation of said housing with respect to said handle means.

* * * * *